US009911410B2

(12) United States Patent
Ben-David

(10) Patent No.: US 9,911,410 B2
(45) Date of Patent: Mar. 6, 2018

(54) ADAPTATION OF SPEECH RECOGNITION

(71) Applicant: International Business Machines Corporation, Armonk, NY (US)

(72) Inventor: Shay Ben-David, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 56 days.

(21) Appl. No.: 14/829,785

(22) Filed: Aug. 19, 2015

(65) Prior Publication Data

US 2017/0053643 A1    Feb. 23, 2017

(51) Int. Cl.
| G06F 15/00 | (2006.01) |
|---|---|
| G10L 15/00 | (2013.01) |
| G10L 15/04 | (2013.01) |
| G10L 15/16 | (2006.01) |
| G10L 15/26 | (2006.01) |
| G10L 25/00 | (2013.01) |
| G10L 15/065 | (2013.01) |
| G10L 15/30 | (2013.01) |
| G10L 15/06 | (2013.01) |

(52) U.S. Cl.
CPC .......... *G10L 15/065* (2013.01); *G10L 15/30* (2013.01); *G10L 2015/0631* (2013.01); *G10L 2015/0638* (2013.01)

(58) Field of Classification Search
None
See application file for complete search history.

(56) References Cited

U.S. PATENT DOCUMENTS

| 6,766,295 | B1 | 7/2004 | Murveit et al. |
| 7,165,030 | B2 * | 1/2007 | Yi ..................... G10L 13/06 |
| | | | 704/238 |
| 8,374,865 | B1 * | 2/2013 | Biadsy ............. G10L 15/183 |
| | | | 704/243 |
| 8,600,746 | B1 | 12/2013 | Lei et al. |
| 8,965,765 | B2 | 2/2015 | Zweig et al. |
| 2002/0198710 | A1 * | 12/2002 | Hernandez-Abrego G10L 15/065 |
| | | | 704/233 |

(Continued)

OTHER PUBLICATIONS

Mell et al., "The NIST Definition of Cloud Computing", National Institue of Standards and Technology, Special Publication 800-145, Sep. 2011, pp. 1-7.

*Primary Examiner* — Richemond Dorvil
*Assistant Examiner* — Thuykhanh Le
(74) *Attorney, Agent, or Firm* — Erik K. Johnson

(57) ABSTRACT

A method, computer program product, and system for adapting speech recognition of a user's speech is provided. The method includes receiving a first utterance from a user having a duration below a predetermined threshold, identifying at least one further utterance from the user that provides additional information, generating a concatenated utterance by concatenating the first utterance with the at least one further utterance, transmitting the concatenated utterance to a speech recognition server, receiving a transcription of the concatenated utterance from the speech recognition server that includes a transcription of the first utterance, and extracting the transcription of the first utterance from the transcription of the concatenated utterance. The transcription of the first utterance is based on the additional information provided by the at least one further utterance.

19 Claims, 7 Drawing Sheets

(56) References Cited

U.S. PATENT DOCUMENTS

| | | | | |
|---|---|---|---|---|
| 2003/0120486 A1* | 6/2003 | Brittan | G10L 15/32 | 704/231 |
| 2004/0199393 A1* | 10/2004 | Arizmendi | G10L 15/285 | 704/277 |
| 2006/0247925 A1* | 11/2006 | Haenel | G10L 15/22 | 704/215 |
| 2006/0277030 A1* | 12/2006 | Bedworth | G06F 17/2735 | 704/4 |
| 2008/0154601 A1* | 6/2008 | Stifelman | G10L 15/22 | 704/251 |
| 2009/0319270 A1* | 12/2009 | Gross | G10L 15/22 | 704/246 |
| 2010/0145709 A1* | 6/2010 | Kumar | G10L 17/22 | 704/273 |
| 2011/0078585 A1* | 3/2011 | King | G06F 17/30011 | 715/751 |
| 2012/0253807 A1* | 10/2012 | Kamano | G10L 25/63 | 704/240 |
| 2013/0021459 A1* | 1/2013 | Vasilieff | G10L 25/78 | 348/77 |
| 2013/0141643 A1* | 6/2013 | Carson | H04N 21/4307 | 348/515 |
| 2014/0012586 A1* | 1/2014 | Rubin | G10L 25/51 | 704/273 |
| 2014/0156276 A1* | 6/2014 | Nakano | G10L 15/222 | 704/246 |
| 2014/0250355 A1* | 9/2014 | Jimison | G06F 3/0483 | 715/202 |
| 2014/0278399 A1* | 9/2014 | Rodman | H04M 3/568 | 704/233 |
| 2014/0358536 A1* | 12/2014 | Choi | G10L 15/26 | 704/235 |
| 2015/0039298 A1* | 2/2015 | Lu | G10L 15/22 | 704/201 |
| 2015/0052128 A1* | 2/2015 | Sharifi | G06Q 30/0631 | 707/727 |
| 2015/0066506 A1* | 3/2015 | Romano | G10L 15/1822 | 704/235 |
| 2015/0106087 A1* | 4/2015 | Newman | G10L 25/78 | 704/233 |
| 2015/0234924 A1* | 8/2015 | Schydlowsky | G06F 17/30864 | 705/14.54 |
| 2015/0235642 A1* | 8/2015 | Nishikawa | G10L 17/00 | 704/249 |
| 2016/0057261 A1* | 2/2016 | Bang | H04M 1/271 | 455/563 |
| 2016/0125893 A1* | 5/2016 | Le Magoarou | G10L 21/0272 | 704/204 |
| 2016/0253923 A1* | 9/2016 | Wang | G09B 5/04 | |

* cited by examiner

ADAPTATION OF SPEECH RECOGNITION

BACKGROUND

The present invention generally relates to adapting speech recognition to a user's speech, and more particularly to adapting speech recognition to a user's speech by concatenating utterances from the user.

Speech recognition by a computer, also known as automatic speech recognition (ASR) or speech to text (STT), may utilize two types of speech recognition models: an acoustic model and a language model. An acoustic model may rely on relationships between an audio signal and the phonetic units present in that audio signal. A language model may rely on relationships between words in a spoken sentence (i.e., word sequences in language). Speech recognition servers/systems may determine text based on the highest combined probability for both acoustic and language models. However, there may be a mismatch between the text determined by the models and the actual words in a user's speech. Such mismatches may increase for short utterances resulting in deteriorated speech recognition accuracy.

To improve speech recognition accuracy, a speech recognition system may obtain "training" (or "enrollment") speech from the user, which the system may use to adapt a general acoustic model and/or a general language model to the user's speech. System training may involve a user reading text or isolated vocabulary into the system. Such systems are known as "speaker-dependent" systems. Systems that do not use training are known as "speaker-independent" systems.

System training and/or adaptation may occur during a single user session or across multiple user sessions. In session adaptation relies on long utterances from the user (e.g., a lecture), which the system may use to learn both acoustic information for the user and language context. Adaptation across multiple user sessions requires user identification to link multiple sessions by the user into a single, long utterance. Speech recognition systems utilizing adaptation across multiple user sessions may require large amounts of storage to store each user's utterances and/or adapted models, which may affect scalability of these systems.

SUMMARY

According to one embodiment, a method for adapting speech recognition of a user's speech is provided. The method may include receiving a first utterance from the user having an amount of time associated with the first utterance below a predetermined duration threshold, identifying, based on the amount of time associated with the first utterance being below the predetermined threshold, at least one further utterance from the user that provides additional information, generating a concatenated utterance by concatenating the first utterance with the at least one further utterance, transmitting the concatenated utterance to a speech recognition server, receiving a transcription of the concatenated utterance from the speech recognition server, and extracting a transcription of the first utterance from the transcription of the concatenated utterance. The transcription of the concatenated utterance includes the transcription of the first utterance, which is based in part on (i.e., enhanced by) the additional information (e.g., both acoustical and language context) provided by the at least one further utterance.

According to one embodiment, a method for adapting speech recognition of a user's speech is provided. The method may include receiving a first utterance from the user having a number of phonetic units associated with the first utterance below a predetermined phonetic threshold, identifying, based on the number of phonetic units associated with the first utterance being below the predetermined threshold, at least one further utterance from the user that provides additional information, generating a concatenated utterance by concatenating the first utterance with the at least one further utterance, transmitting the concatenated utterance to a speech recognition server, receiving a transcription of the concatenated utterance from the speech recognition server, and extracting a transcription of the first utterance from the transcription of the concatenated utterance. The transcription of the concatenated utterance includes the transcription of the first utterance, which is based in part on (i.e., enhanced by) the additional information (e.g., both acoustical and language context) provided by the at least one further utterance.

According to one embodiment, a method for adapting speech recognition of a user's speech is provided. The method may include receiving a first utterance from the user having an expected speech recognition accuracy of the first utterance below a predetermined accuracy threshold, identifying, based on the expected speech recognition accuracy of the first utterance being below the predetermined threshold, at least one further utterance from the user that provides additional information, generating a concatenated utterance by concatenating the first utterance with the at least one further utterance, transmitting the concatenated utterance to a speech recognition server, receiving a transcription of the concatenated utterance from the speech recognition server, and extracting a transcription of the first utterance from the transcription of the concatenated utterance. The transcription of the concatenated utterance includes the transcription of the first utterance, which is based in part on (i.e., enhanced by) the additional information (e.g., both acoustical and language context) provided by the at least one further utterance.

According to another embodiment, a computer program product for adapting speech recognition of a user's speech is provided. The computer program product may include at least one computer readable non-transitory storage medium having computer readable program instructions for execution by a processor. The computer readable program instructions include instructions for receiving a first utterance from the user having an amount of time associated with the first utterance below a predetermined duration threshold, identifying, based on the amount of time associated with the first utterance being below the predetermined threshold, at least one further utterance from the user that provides additional information, generating a concatenated utterance by concatenating the first utterance with the at least one further utterance, transmitting the concatenated utterance to a speech recognition server, receiving a transcription of the concatenated utterance from the speech recognition server, and extracting a transcription of the first utterance from the transcription of the concatenated utterance. The transcription of the concatenated utterance includes the transcription of the first utterance, which is based on the additional information provided by the at least one further utterance.

According to another embodiment, a system for adapting speech recognition of a user's speech is provided. The system may include at least one processor, at least one computer readable memory, at least one computer readable tangible, non-transitory storage medium, and program instructions stored on the at least one computer readable tangible, non-transitory storage medium for execution by the at least one processor via the at least one computer readable memory. The program instructions include instructions for receiving a first utterance from the user having an amount of time associated with the first utterance below a predetermined duration threshold, identifying, based on the amount of time associated with the first utterance being below the predetermined threshold, at least one further utterance from the user that provides additional information, generating a concatenated utterance by concatenating the first utterance with the at least one further utterance, transmitting the concatenated utterance to a speech recognition server, receiving a transcription of the concatenated utterance from the speech recognition server, and extracting a transcription of the first utterance from the transcription of the concatenated utterance. The transcription of the concatenated utterance includes the transcription of the first utterance, which is based on the additional information provided by the at least one further utterance.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Various embodiments of the present invention will now be discussed with reference to FIGS. 1 through 7, like numerals being used for like and corresponding parts of the various drawings.

According to one embodiment, a method is provided for adapting a speech recognition system to increase recognition accuracy of a short utterance by concatenating the short utterance with at least one further utterance, transmitting the concatenated utterance to a speech recognition server, receiving a transcription of the concatenated utterance, and extracting a transcription of the short utterance from the transcription of the concatenated utterance. The method, systems, and computer program products disclosed herein may improve the speech recognition (and transcription) accuracy of short utterances, e.g., by speaker-independent speech recognition servers/systems.

The short utterance may be a brief or short piece of speech (e.g., an utterance having a duration less than 4 seconds or the short utterance may have few phonetic units (e.g., less than 15 phonetic units). Traditional speaker-independent speech recognition servers may have low accuracy in recognizing and/or transcribing such short utterances. The at least one further utterance (concatenated with the short utterance) may provide additional information that a speech recognition server may utilize to recognize the short utterance (as well as the concatenated utterance). The additional information in the further utterances may include contextual language information and/or additional phonetic units. The transcription of the short utterance may be extracted from the transcription of the concatenated utterance based on time-stamps associated with the short utterance and the at least one further utterance and/or identification of the text associated with the at least one further utterance.

Figure 1:
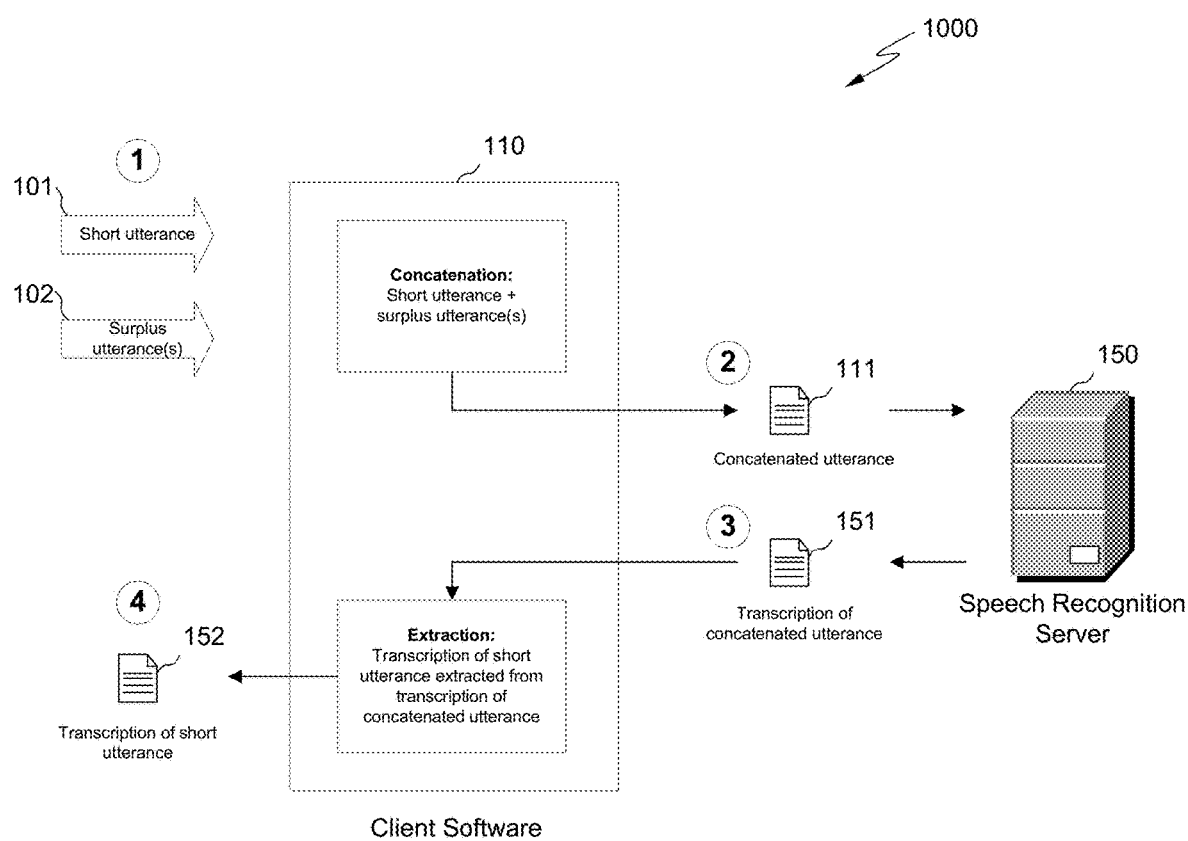
FIG. 1 is a block diagram illustrating a system employing a method for adapting speech recognition of a user's speech, according to an embodiment.

FIG. 1 depicts a block diagram illustrating a system 1000 employing an exemplary method for adapting a speech recognition system to increase recognition accuracy of a short utterance, according to an embodiment disclosed herein. Short utterance 101 and surplus utterance(s) 102 (e.g., at least one further utterance) are received by client software 110, which concatenates the short utterance 101 with the surplus utterance(s) 102. The concatenated utterance 111 is transmitted to speech recognition server 150, which recognizes and generates a transcription of the concatenated utterance 151. The transcription of the concatenated utterance 151 is transmitted to the client software 110, which extracts a transcription of the short utterance 152 from the transcription of the concatenated utterance 151.

Client software 110 may transmit the concatenated utterance 111 as a digital file (e.g., an audio file, an encoded file, etc.) to the speech recognition server 150. The speech recognition server 150 may be provided over the internet, e.g., as a cloud-based service. The speech recognition server 150 may be, or may be treated as, a speaker-independent system. In some embodiments, the client software 110 represents an independent speaker and/or a first-time user of the speech recognition server 150. According to the methods, systems, and/or computer program products disclosed herein, client software 110 may enable enhanced speech recognition of a short utterance (e.g., short utterance 101) without the speech recognition server 150 identifying the speaker and/or adapting a speech model based on the speaker's previous inputs/sessions. As such, premium speech recognition accuracy may be achieved from a speaker-independent speech recognition server/system.

Unlike prior art methods that require some sort of speaker identification to adapt a speech recognition model (in order to associate any previous speech recognition session(s) with a single speaker), the methods disclosed herein may achieve premium speech recognition accuracy of short utterances without speaker identification and/or multiple sessions with the speech recognition server. As such, increased recognition accuracy of a short utterance may be achieved in a single speech recognition session and/or with a single utterance, e.g., a concatenated utterance 111.

Speech recognition server 150 may utilize various speech recognition models/algorithms to recognize the utterances in concatenated utterance 111. Additional information included with the surplus utterance(s) 102 that were concatenated with the short utterance 101 may provide speech recognition server 150 with contextual language information and/or additional phonetic units, which speech recognition server 150 may use to recognize the short utterance 101 (and the surplus utterance(s) 102). For example, the short utterance 101 may be "IBM" and the surplus utterances 102 may be "I want to buy 100 shares of" and "stock." The concatenated utterance 111 may be <"I want to buy 100 shares of"><"IBM"><"stock">. Speech recognition server 150 may use (and/or adapt) a language model that recognizes "IBM" based (in part) on the contextual language of purchasing "100 shares of" "stock." Speech recognition server 150 may also, or alternatively, use (and/or adapt) an acoustic model that recognizes "IBM" based (in part) on the additional phonetic units provided from the surplus utterances.

Client software 110 may extract the transcription of the short utterance 152 from the transcription of the concatenated utterance 151 based on a time stamp associated with short utterance 101 and time stamp(s) associated with surplus utterances 102. For example, client software 110 may associate time stamps with the time of reception (or obtainment) of the short utterance 101 and surplus utterance(s) 102. A file encoding the concatenated utterance 111 may include the original time stamps respectively associated with the short utterance 101 and the surplus utterance(s) 102. A file including the transcription of the concatenated utterance 151 may further include the original time stamps for the short utterance 101 and the surplus utterance(s) 102. Client software 110 may identify a portion of the transcription of the concatenated utterance 151 associated with the original time stamp for the short utterance 101. Client software 110 may discard the other portions of the transcription of the concatenated utterance 151, i.e., those portions associated with the original time stamp(s) for the surplus utterance(s) 102, and/or isolate the transcription of the short utterance 152 for further processing/analysis within the same client software 110 or other software/middleware, service, etc.

Alternatively, or in addition, client software 110 may extract the transcription of the short utterance 152 from the transcription of the concatenated utterance 151 based on identification of text associated with the surplus utterance(s) 102. For example, client software 110 may request a user to provide specific surplus utterances (e.g., enrollment material), such as "I want to buy 100 share of" and "stock." Upon reception (or obtainment) of those specific surplus utterances, client software 110 may associate that text with the received/obtained speech. Upon or after receipt of the transcription of the concatenated utterance 151, client software 110 may identify portion(s) of the transcription of the concatenated utterance 151 that pertain to text associated with the surplus utterance(s) 102. Client software 110 may discard those portions of the transcription of the concatenated utterance 151, and/or isolate the remaining portions of the transcription of the concatenated utterance 151, i.e., the transcription of the short utterance 152, for further processing/analysis within the same client software 110 or other software/middleware, service, etc.

In some embodiments, one or more of the functions performed by client software 110, discussed herein, may instead be performed by middleware. In one embodiment, client software 110 may be substituted by middleware.

Figure 2:
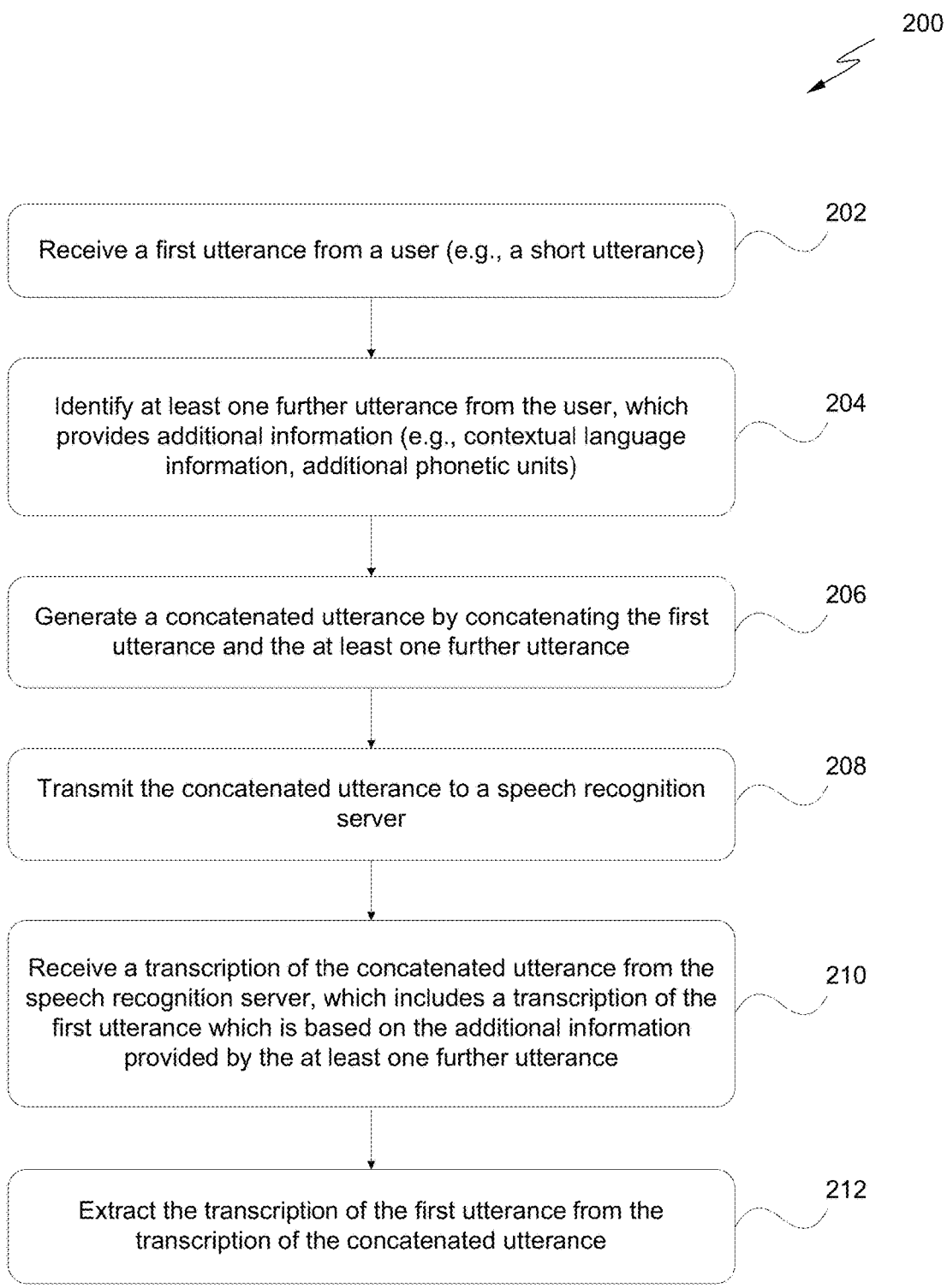
FIGS. 2-4 are flowcharts illustrating methods for adapting speech recognition of a user's speech, according to various embodiments.

FIG. 2 depicts a flowchart illustrating an exemplary method 200 for adapting a speech recognition system to increase recognition accuracy of a first utterance, e.g., a short utterance, according to an embodiment disclosed herein. At 202, according to one method embodiment, a first utterance is received (or obtained) from a user. The first utterance may have a duration (e.g., an amount of time associated with the first utterance) below a predetermined duration threshold. For example, the duration of the first utterance may be less than 4 seconds. In one embodiment, the first utterance may have a number of phonetic units below a predetermined phonetic threshold. For example, the first utterance may have less than 15 phonetic units. In another embodiment, the first utterance may have an expected speech recognition accuracy below a predetermined accuracy threshold.

At 204, at least one further utterance from the user is identified. The at least one further utterance may provide additional information, which a speech recognition server may use to recognize the first utterance. The additional information provided in the at least one further utterance may include at least one of contextual language information and additional phonetic units. At 206, a concatenated utterance is generated by concatenating the first utterance with the at least one further utterance.

At 208, the concatenated utterance is transmitted to a speech recognition server. In one embodiment, the speech recognition server is a speaker-independent system. At 210, a transcription of the concatenated utterance is received from the speech recognition server. The transcription of the concatenated utterance includes a transcription of the first utterance, which is based on the additional information provided by the at least one further utterance.

At 212, the transcription of the first utterance is extracted from the transcription of the concatenated utterance. The extraction may include identifying the transcription of the first utterance based on at least one of identifying a time stamp associated with the first utterance and identifying text associated with the at least one further utterance.

In one embodiment, when the first utterance from the user has an expected speech recognition accuracy below a predetermined accuracy threshold, the method may include an actual speech recognition accuracy of the first utterance (e.g., by the speech recognition server), based on the additional information provided by the at least one further utterance, that is greater than the expected speech recognition accuracy of the first utterance. For example, it may be determined that a short utterance will have a low speech recognition accuracy, e.g., according to a general acoustic and/or language model in a speaker-independent system. The methods, systems, and computer program products disclosed herein may enable a speech recognition server (e.g., a speaker-independent system utilizing a general acoustic and/or language model) to have increased speech recognition accuracy of the short utterance.

The transcript of the concatenated utterance may contain errors, e.g., transcription errors, at least with respect to the surplus utterances (i.e., the at least one further utterance). As such, in one embodiment, the transcript of the concatenated utterance may be compared against text and words associated with the surplus utterances. For example, referring back to FIG. 1, client software 110 may concatenate short utterance 101 with surplus utterances 102 that client software 110 has associated specific text, e.g., "I want to buy 100 shares of" and "stock". Upon receipt of the transcription of the concatenated utterance 151, client software 110 may examine the text within that transcription to determine whether the expected specific surplus words are present in the received transcription. If the words are missing, client software 110 may employ various techniques to determine text that is similar and/or approximate to the expected specific words associated with the surplus utterances 102. Such techniques include evaluating one or more Levenshtein distances between the words included in the received transcription and the expected specific words of the surplus utterances, and fuzzy matching, which may identify words that are approximate matches to the expected words.

In one embodiment, extracting the transcription of the first utterance from the transcription of the concatenated utterance is based on identifying text associated with the at least one further utterance, and includes analyzing text of the transcription of the concatenated utterance to determine an approximate correspondence to text associated with the at least one further utterance. In one embodiment, analyzing the text of the transcription of the concatenated utterance is based on at least one of evaluating one or more Levenshtein distances and fuzzy matching.

With continued reference to FIG. 1, client software 110 may request a short utterance from a user and proceed to concatenate the short utterance with one or more appropriate surplus utterances. For example, client software 110 may request that the user say a stock ticker symbol, which may be expected to be a short utterance, e.g., "IBM," and, upon receipt of the user's response, client software 110 may proceed to concatenate the response with the appropriate surplus utterance(s). In this embodiment, the received response may be treated as an utterance having a duration below a predetermined duration threshold. Alternatively, client software 110 may request information that may or may not return a short utterance, and client software 110 may determine whether the user's response is a short utterance (e.g., having a duration below a predetermined duration threshold). For example, client software 110 may request a company's name, which may produce a response that is either sufficiently long in duration for adequate speech recognition or brief in duration, e.g., "International Business Machines" or "IBM," respectively. Client software 110 may determine that "IBM" is a short utterance (i.e., having a duration below a predetermined duration threshold). In response to such a determination, client software 110 may proceed to concatenate the short utterance with the appropriate surplus utterance(s).

Figure 3:
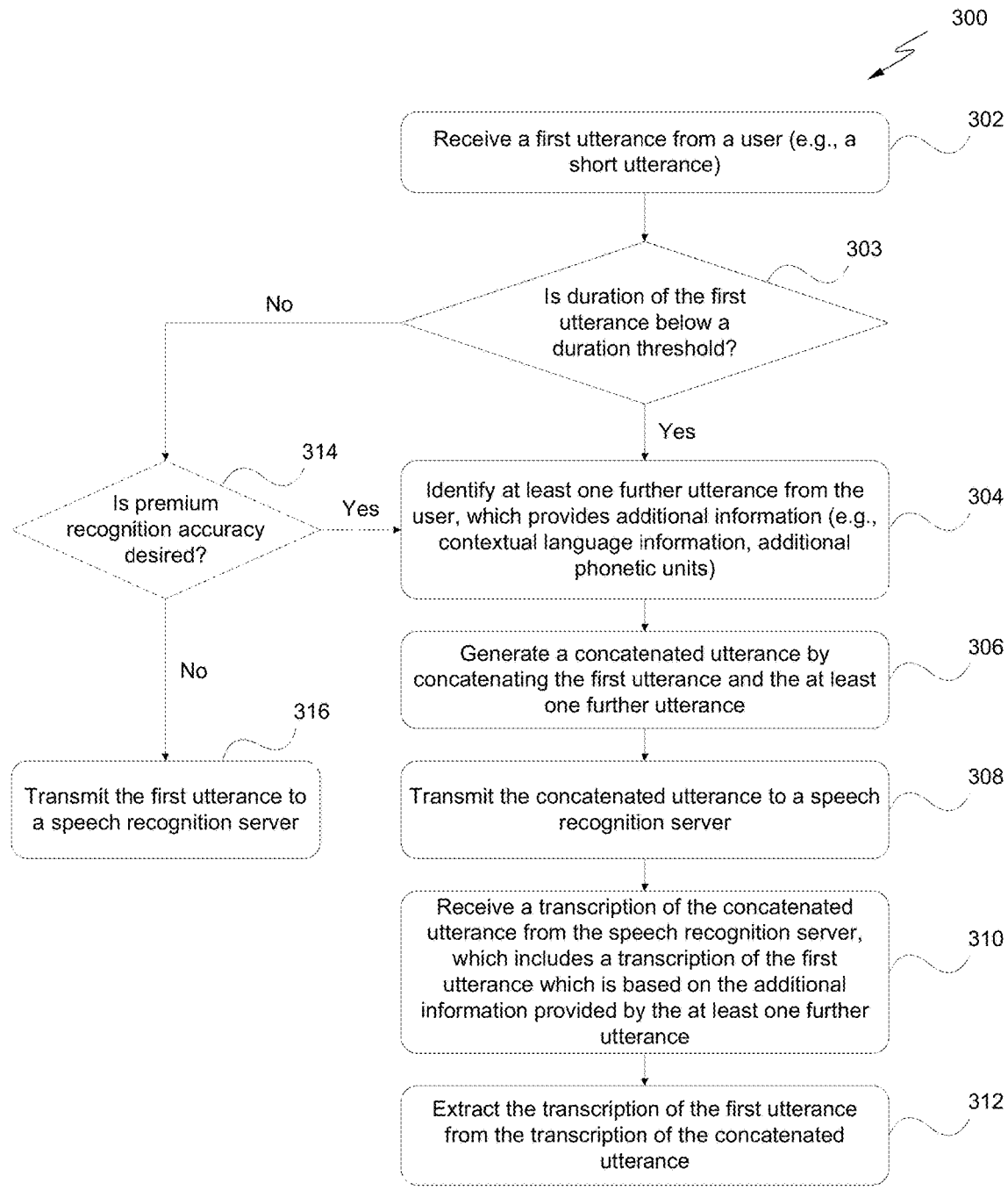

FIG. 3 depicts a flowchart illustrating another exemplary method 300 for adapting a speech recognition system to increase recognition accuracy of a first utterance, e.g., a short utterance, according to an embodiment disclosed herein. At 302, according to one method embodiment, a first utterance is received (or obtained) from a user. At 303, the duration of the first utterance (i.e., an amount of time associated with the first utterance) is considered and a determination is made as to whether the duration of the first utterance is below a predetermined duration threshold. If the duration of the first utterance is below the predetermined threshold, at 304, at least one further utterance from the user is identified, which may provide additional information, which a speech recognition server may use to recognize the first utterance.

Similar to the flowchart depicted in FIG. 2 (regarding steps 206, 208, 210, 212), at 306, a concatenated utterance is generated by concatenating the first utterance with the at least one further utterance; at 308, the concatenated utterance is transmitted to a speech recognition server; at 310, a transcription of the concatenated utterance is received from the speech recognition server, which includes a transcription of the first utterance, which is based on the additional information provided by the at least one further utterance; and at 312, the transcription of the first utterance is extracted from the transcription of the concatenated utterance.

Referring back to step 303, if the duration of the first utterance is not below the predetermined threshold, the first utterance may be transmitted to the speech recognition server without any concatenation, see, e.g., step 316. For example, the first utterance may have sufficient duration and/or phonetic units to achieve a suitable level of speech recognition accuracy from the speech recognition server, and the method may dispense with the concatenation process. However, if premium speech recognition accuracy (i.e., an increased level of accuracy) is nonetheless desired, the exemplary method disclosed herein may engage the concatenation process by incorporating an optional step 314. At 314, it is determined whether premium speech recognition accuracy is desired. If it is, the method continues to step 304 and so on. If premium speech recognition accuracy is not desired, the first utterance is transmitted to the speech recognition server without concatenation.

In one embodiment, the determination made at 303 may be replaced by a determination of a number of phonetic units associated with the first utterance. In other words, the number of phonetic units for the first utterance is considered and a determination is made as to whether the number of phonetic units is below a predetermined threshold.

In another embodiment, the determination made at 303 may be replaced by a determination of an expected speech recognition accuracy of the first utterance. In other words, the expected speech recognition accuracy of the first utterance is considered and a determination is made as to whether the expected speech recognition is below a predetermined threshold.

Referring back to FIG. 1, in some embodiments, client software 110 may identify and recognize a user and associate all utterances with that user. Client software 110 may anonymously transmit information (e.g., concatenated utterance 111) to a speech recognition server 150, which the speech recognition server 150 may log and track as an initial session that may be linked to further sessions for the same (anonymized) user, e.g., by registering the requesting user's Internet Protocol ("IP") address. However, multiple sessions with the speech recognition server 150 (or the service associated with speech recognition server 150) are not required to achieve suitable, e.g., premium, recognition accuracy of a short utterance 101, according to the methods disclosed herein.

Figure 4:
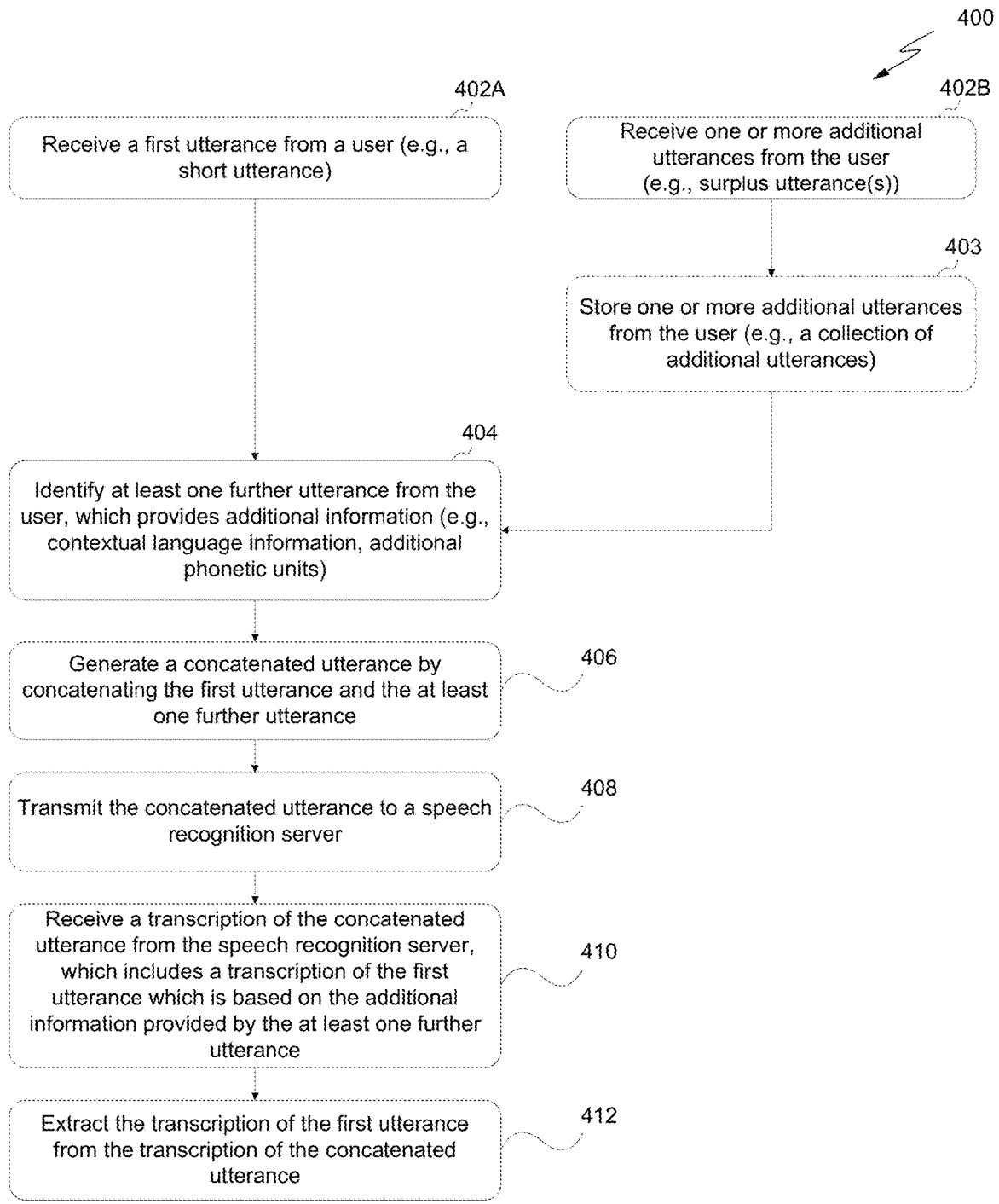

FIG. 4 depicts a flowchart illustrating another exemplary method 400 for adapting a speech recognition system to increase recognition accuracy of a first utterance, e.g., a short utterance, according to an embodiment disclosed herein. At 402A, a first utterance is received (or obtained) from a user.

At 402B, one or more additional utterances (e.g., surplus utterance(s)) are received (or obtained) from the user. In one embodiment, the one or more additional utterances are received in response to request(s) for additional utterances (e.g., enrollment material) from the user. For example, client software 110 may ask the user to recite specific words. Such requests may occur before, after, or during the obtainment of the first utterance. In a preferred embodiment, the receiving (or obtaining) the one or more additional utterances occurs before receiving (or obtaining) the first utterance.

In one embodiment, the one or more additional utterances may be received during a speech recognition session that is different from the speech recognition session when the first utterance is received. The different speech recognition session may occur before or after the speech recognition session when the first utterance is received.

In one embodiment, the one or more additional utterances are received from the user in a passive fashion. For example, client software 110 may obtain the one or more additional utterances without specifically prompting the user to recite any specific enrollment words. Instead, client software 110 may obtain the one or more additional utterances during the normal course of the speech recognition session, and the one or more additional utterances may be any utterance (other than the first utterance) provided by the user.

In one embodiment, the one or more additional utterances are stored as a collection of additional utterances (e.g., a collection of surplus utterances for possible concatenation), see, e.g., 403.

At 404, at least one further utterance from the user is identified (e.g., selected) from the one or more additional utterances, which may provide additional information, which a speech recognition server may use to recognize the first utterance. In one embodiment, the one or more additional utterances are retrieved from a collection of additional utterances from the user, see, e.g., 403.

In one embodiment, the at least one further utterance is selected from the one or more additional utterances by analyzing phonemes with the first utterance, analyzing phonemes within each of the one or more additional utterances, and selecting one or more of the one or more additional utterances that are phonetically balanced with the first utterance. The identification of the at least one further utterance for concatenation may include a consideration for the optimal further utterance, and such considerations may include the phonetic nature of the prospective concatenated utterance. Additional considerations may include the user's accent and language context. For example, identification of the at least one further utterance for concatenation may include determining which of the further utterances will provide the optimal language context for the short utterance.

Similar to the flowchart depicted in FIG. 2 (regarding steps 206, 208, 210, 212), at 406, a concatenated utterance is generated by concatenating the first utterance with the at least one further utterance; at 408, the concatenated utterance is transmitted to a speech recognition server; at 410, a transcription of the concatenated utterance is received from the speech recognition server, which includes a transcription of the first utterance, which is based on the additional information provided by the at least one further utterance; and at 412, the transcription of the first utterance is extracted from the transcription of the concatenated utterance.

In one embodiment, the user is anonymous to the speech recognition server.

In one embodiment, the method is performed by client software that communicates with the speech recognition server.

In one embodiment, the speech recognition server is provided as a cloud-based server. In another embodiment, the method is performed by middleware.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows. On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows. Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows. Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
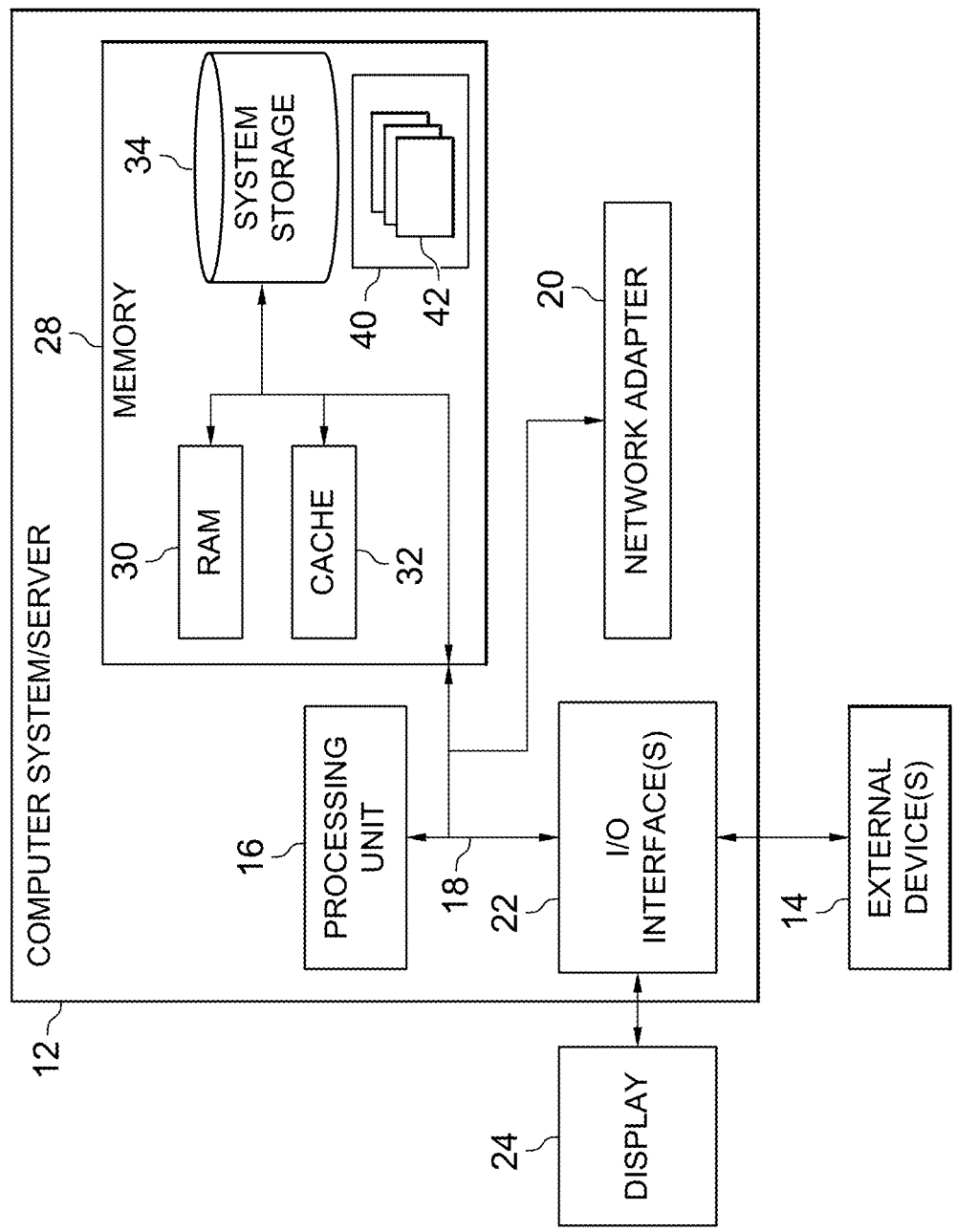
FIG. 5 is a block diagram illustrating a cloud computing node, according to an embodiment.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
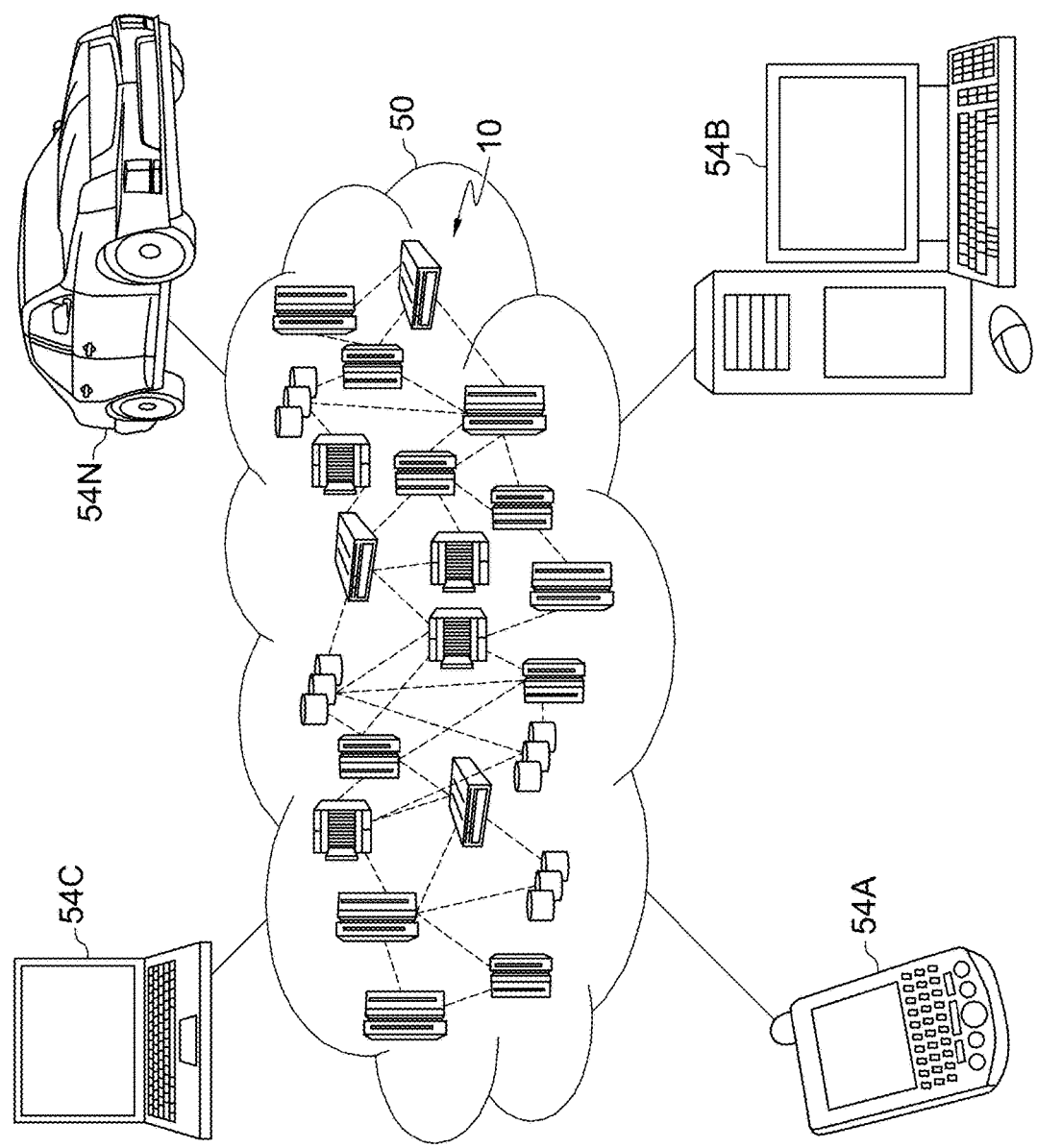
FIG. 6 depicts a cloud computing environment, according to an embodiment.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
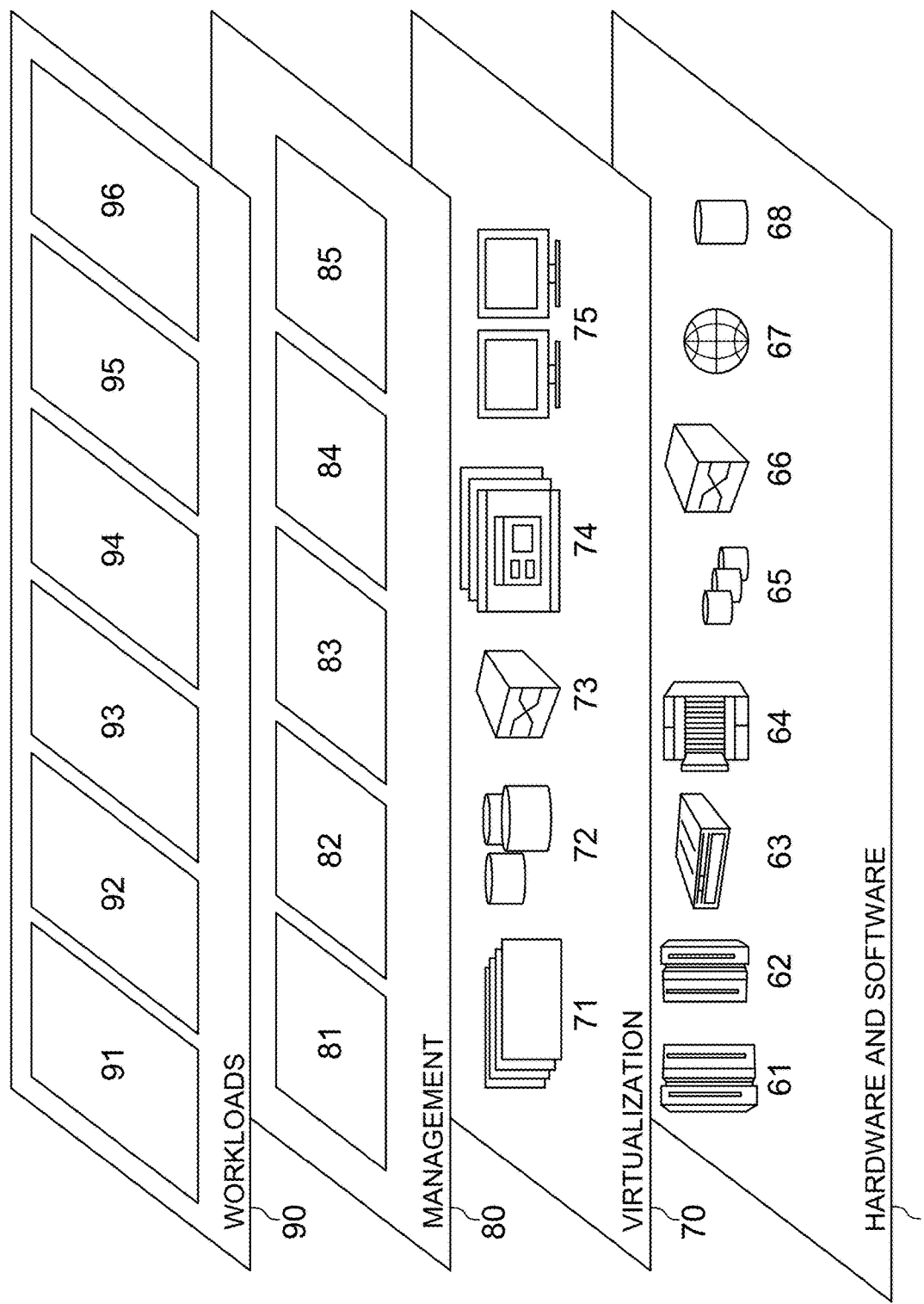
FIG. 7 depicts abstraction model layers, according to an embodiment.

Referring now to FIG. 7, a set of functional abstraction layers provided by cloud computing environment 50 (FIG. 6) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and speech recognition processing 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for adapting a speech recognition system, the method comprising:
   receiving a first utterance from a user;
   determining an amount of time of the first utterance from the user is below a predetermined duration threshold;
   identifying at least one further utterance from the user, wherein the at least one further utterance provides additional information, the additional information comprising contextual language information, the at least one further utterance being identified in response to determining that the amount of time of the first utterance is below the predetermined duration threshold;
   generating a concatenated utterance by concatenating the first utterance with the at least one further utterance;
   transmitting the concatenated utterance to a speech recognition server;
   receiving a transcription of the concatenated utterance from the speech recognition server, wherein the transcription of the concatenated utterance includes a transcription of the first utterance, and wherein the transcription of the first utterance is based on the additional information provided by the at least one further utterance;
   extracting the transcription of the first utterance from the transcription of the concatenated utterance; and
   sending the extracted transcription to a computer device of the user, the computer device communicating with the speech recognition server.

2. The method according to claim 1, wherein the additional information includes at least one of contextual language information and additional phonetic units.

3. The method according to claim 1, wherein extracting the transcription of the first utterance from the transcription of the concatenated utterance comprises:
   identifying the transcription of the first utterance based on at least one of identifying a time stamp associated with the first utterance and identifying text associated with the at least one further utterance.

4. The method according to claim 3, wherein identifying the transcription of the first utterance is based on identifying text associated with the at least one further utterance, and the method further comprising:
   analyzing text of the transcription of the concatenated utterance to determine an approximate correspondence to text associated with the at least one further utterance.

5. The method according to claim 4, wherein analyzing the text of the transcription of the concatenated utterances is based on at least one of evaluating one or more Levenshtein distances and fuzzy matching.

6. The method according to claim 1, further comprising: determining the amount of time associated with the first utterance from the user is below the predetermined duration threshold.

7. The method according to claim 1, wherein identifying the at least one further utterance comprises:
selecting the at least one further utterance for concatenation from one or more additional utterances from the user.

8. The method according to claim 7, wherein the one or more additional utterances are received in response to a request for additional utterances from the user.

9. The method according to claim 7, wherein the one or more additional utterances are retrieved from a collection of additional utterances from the user.

10. The method according to claim 7, wherein the one or more additional utterances received during a speech recognition session that is different from the speech recognition session wherein the first utterance is received.

11. The method according to claim 7, wherein selecting the at least one further utterance for concatenation from one or more additional utterances from the user comprises:
analyzing phonemes within the first utterance;
analyzing phonemes within each of the one or more additional utterances; and
selecting one or more of the one or more additional utterances that are phonetically balanced with the first utterance.

12. The method according to claim 1, wherein the user is anonymous to the speech recognition server.

13. The method according to claim 1, wherein the method is performed by client software that communicates with the speech recognition server.

14. The method according to claim 1, wherein the speech recognition server is provided as a cloud-based service.

15. The method according to claim 14, wherein the method is performed by middleware.

16. A computer program product for adapting a speech recognition system, the computer program product comprising at least one computer readable non-transitory storage medium having computer readable program instructions thereon for execution by a processor, the computer readable program instructions comprising program instructions for:
receiving a first utterance from a user;
determining an amount of time of the first utterance from the user is below a predetermined duration threshold;
identifying at least one further utterance from the user, wherein the at least one further utterance provides additional information, the additional information comprising contextual language information, the at least one further utterance being identified in response to determining that the amount of time of the first utterance is below the predetermined duration threshold;
generating a concatenated utterance by concatenating the first utterance with the at least one further utterance;
transmitting the concatenated utterance to a speech recognition server;
receiving a transcription of the concatenated utterance from the speech recognition server, wherein the transcription of the concatenated utterance includes a transcription of the first utterance, and wherein the transcription of the first utterance is based on the additional information provided by the at least one further utterance;
extracting the transcription of the first utterance from the transcription of the concatenated utterance; and
sending the extracted transcription to a computer device of the user, the computer device communicating with the speech recognition server.

17. The computer program product according to claim 16, wherein extracting a transcription of the first utterance from the transcription of the concatenated utterance comprises:
identifying the transcription of the first utterance based on at least one of identifying a time stamp associated with the first utterance and identifying text associated with the at least one further utterance.

18. A computer system for adapting a speech recognition system, the computer system comprising:
at least one processor;
at least one computer readable memory;
at least one computer readable tangible, non-transitory storage medium; and;
program instructions stored on the at least one computer readable tangible, non-transitory storage medium for execution by the at least one processor via the at least one computer readable memory, wherein the program instructions comprise program instructions for:
receiving a first utterance from a user;
determining an amount of time of the first utterance from the user is below a predetermined duration threshold;
identifying at least one further utterance from the user, wherein the at least one further utterance provides additional information, the additional information comprising contextual language information, the at least one further utterance being identified in response to determining that the amount of time of the first utterance is below the predetermined duration threshold;
generating a concatenated utterance by concatenating the first utterance with the at least one further utterance;
transmitting the concatenated utterance to a speech recognition server;
receiving a transcription of the concatenated utterance from the speech recognition server, wherein the transcription of the concatenated utterance includes a transcription of the first utterance, and wherein the transcription of the first utterance is based on the additional information provided by the at least one further utterance;
extracting the transcription of the first utterance from the transcription of the concatenated utterance; and
sending the extracted transcription to a computer device of the user, the computer device communicating with the speech recognition server.

19. The computer system according to claim 18, wherein extracting a transcription of the first utterance from the transcription of the concatenated utterance comprises:
identifying the transcription of the first utterance based on at least one of identifying a time stamp associated with the first utterance and identifying text associated with the at least one further utterance.

* * * * *